(12) United States Patent
Fischer et al.

(10) Patent No.: US 10,636,589 B2
(45) Date of Patent: Apr. 28, 2020

(54) SWITCHING DEVICE WITH A MODULAR AUXILIARY SWITCHING UNIT

(71) Applicant: Siemens Aktiengesellschaft, Munich (DE)

(72) Inventors: Daniela Fischer, Amberg (DE); Josef Graf, Hahnbach (DE); Alexander Oberleiter, Thalheim (DE); Norbert Zimmermann, Sulzbach-Rosenberg (DE)

(73) Assignee: Siemens Aktiengesellschaft, Munich (DE)

( * ) Notice: Subject to any disclaimer, the term of this patent is extended or adjusted under 35 U.S.C. 154(b) by 200 days.

(21) Appl. No.: 15/507,559

(22) PCT Filed: Jul. 10, 2015

(86) PCT No.: PCT/EP2015/065783
§ 371 (c)(1),
(2) Date: Feb. 28, 2017

(87) PCT Pub. No.: WO2016/037731
PCT Pub. Date: Mar. 17, 2016

(65) Prior Publication Data
US 2017/0287652 A1    Oct. 5, 2017

(30) Foreign Application Priority Data
Sep. 9, 2014  (DE) .................. 10 2014 218 013

(51) Int. Cl.
*H01H 77/00*  (2006.01)
*H01H 3/32*  (2006.01)
(Continued)

(52) U.S. Cl.
CPC ............ *H01H 3/32* (2013.01); *H01H 50/541* (2013.01); *H01H 50/543* (2013.01);
(Continued)

(58) Field of Classification Search
CPC ........ H01H 3/22; H01H 50/453; H01H 71/46; H02P 25/14
(Continued)

(56) References Cited

U.S. PATENT DOCUMENTS 2,290,977 A * 7/1942 Lingal ................... H01H 75/04
335/13
2,649,521 A * 8/1953 Cobb ..................... H01H 50/20
335/126
(Continued)

FOREIGN PATENT DOCUMENTS

| CN | 1262774 | 8/2000 |
|---|---|---|
| CN | 101512706 | 8/2009 |

(Continued)

OTHER PUBLICATIONS

Office Action dated Feb. 28, 2018 which issued in the corresponding Chinese Patent Application No. 201580043950.5.

*Primary Examiner* — Shawki S Ismail
*Assistant Examiner* — Lisa N Homza
(74) *Attorney, Agent, or Firm* — Cozen O'Connor

(57) ABSTRACT

A switching device includes a base module equipped with an electromagnetic drive that has a yoke, a coil and an armature arranged movably relative to the yoke, and that has a switching contact that includes a stationary switching piece and a movable switching piece arranged opposite the stationary switching piece, wherein the switching contact is switchable between an "open" position and a "closed" position via movement of the armature, where the switching device also includes a modular auxiliary switching unit equipped with a contact system that consists of a stationary switching piece and a movable switching piece arranged opposite the stationary switching piece such that the coupling between the base module and the modular auxiliary switching unit is configured such that different distances in (Continued)

the contact system of the auxiliary switching unit are transferrable during a trigger event via an elastic element regardless of the auxiliary switching unit in use.

9 Claims, 4 Drawing Sheets

(51) Int. Cl.
  *H01H 50/54* (2006.01)
  *H01H 71/46* (2006.01)
  *H02P 25/14* (2006.01)

(52) U.S. Cl.
  CPC ............. *H01H 71/46* (2013.01); *H02P 25/14* (2013.01); *H01H 2003/323* (2013.01)

(58) Field of Classification Search
  USPC .................................................. 335/13, 130
  See application file for complete search history.

(56) References Cited

U.S. PATENT DOCUMENTS

| | | | | |
|---|---|---|---|---|
| 2,687,502 A * | 8/1954 | Furnas | ................... | H01H 50/22 200/294 |
| 3,335,375 A * | 8/1967 | Teizo | .................. | H01H 50/32 335/18 |
| 3,388,353 A * | 6/1968 | Isler | .................. | H01H 11/0012 335/132 |
| 4,149,216 A * | 4/1979 | Kussy | ...................... | H01H 9/10 335/6 |
| 4,281,305 A * | 7/1981 | Weeks | .................. | H01H 51/06 335/132 |
| 4,310,817 A * | 1/1982 | McNiel | .................. | B60K 28/14 180/284 |
| 4,703,294 A * | 10/1987 | Yokoyama | ............. | H01H 50/08 335/121 |
| 4,801,906 A * | 1/1989 | Morris | ................. | H01H 71/465 335/13 |
| 4,879,535 A * | 11/1989 | Mori | ...................... | H01H 89/08 335/14 |
| 4,990,875 A * | 2/1991 | Lemarquand | .......... | H01H 51/08 335/131 |
| 5,060,107 A * | 10/1991 | Castonguay | ........... | H01H 9/287 200/321 |
| 5,323,132 A | 6/1994 | Abot et al. | | |
| 6,285,271 B1 | 9/2001 | Bauer et al. | | |
| 6,469,601 B1 * | 10/2002 | Miura | .................... | H01H 83/12 335/11 |
| 6,778,048 B1 * | 8/2004 | Brignoni | .............. | H01H 1/2058 335/132 |
| 8,305,170 B2 * | 11/2012 | Koppmann | ............ | H01H 71/08 335/106 |
| 9,478,381 B2 * | 10/2016 | Lauraire | ............. | H01H 50/002 |
| 2008/0150660 A1 * | 6/2008 | Birzer | .................... | H01H 50/14 335/106 |
| 2009/0325423 A1 | 12/2009 | Bollinger et al. | | |
| 2011/0205003 A1 | 8/2011 | Koppmann et al. | | |
| 2018/0218867 A1 * | 8/2018 | Wyatt | .................. | H01H 1/5805 |
| 2018/0315574 A1 * | 11/2018 | Wyatt | .................. | H01H 50/545 |

FOREIGN PATENT DOCUMENTS

| | | |
|---|---|---|
| CN | 101796606 | 8/2010 |
| DE | 691 08 893 T2 | 8/1995 |
| DE | 100 09 499 C1 | 9/2001 |
| DE | 20 2005 015 448 U1 | 12/2005 |
| DE | 10 2005 040 348 A1 | 3/2007 |
| EP | 0 905 732 A2 | 3/1999 |
| WO | WO 92/06483 A1 | 4/1992 |
| WO | WO 01/65580 | 9/2001 |

* cited by examiner

SWITCHING DEVICE WITH A MODULAR AUXILIARY SWITCHING UNIT

CROSS-REFERENCE TO RELATED APPLICATIONS

This is a U.S. national stage of application No. PCT/EP2015/065783 filed 10 Jul. 2015. Priority is claimed on German Application No. 10 2014 218 013.9 filed 9 Sep. 2014, the content of which is incorporated herein by reference in its entirety.

BACKGROUND OF THE INVENTION

1. Field of the Invention

The invention relates to a switching device comprising a base module, in which is arranged an electromagnetic drive comprised of a yoke, a coil and an armature arranged in a moveable manner relative to the yoke, and a switching contact, comprising a stationary switching piece and a moveable switching piece arranged opposite the stationary switching piece, where switching between an "open" position and a "closed" position can be achieved via movement of the armature, and comprising a modular auxiliary switching unit, in which is arranged a contact system consisting of a stationary switching piece and a moveable switching piece arranged opposite the stationary switching piece.

2. Description of the Related Art

Switching devices, specifically electromagnetic switching devices are employed, for example, in propulsion and automation technology and, in combination with other components, serve for the protection and control of electrical consumers. Switching devices include, for example, relays or contactors. Relays are electromagnetic or electromechanical switches. They are used for the switch-in, switch-out or switchover of electric circuits.

A contactor is an electromagnetically-actuated switch. In this case, a control current flows in a magnetic coil, where contact is effected mechanically via magnetic attraction, thereby closing the main electric circuit. Amongst other applications, contactors have been designed for the switching-in of a consumer with a high power rating, such as a motor, using a manually-operated passing-contact switch with a small switching capacity. Essentially, a contactor is also a relay, but with a significantly higher switching capacity.

The switch-out of a magnetic coil in a switching device of this type, or of a contactor coil of a contactor, causes short-term voltage spikes, which are transmitted to any connected system. These can result in damage to other electrical devices on the system. In order to prevent this, surge limiters are employed.

Switching devices, specifically contactors, are available in various switching device designs for different industrial applications. These switching device designs also require different connection facilities, such as screw terminals, spring contact systems or ring cable lug terminals. These switching device designs have previously been executed in dedicated devices produced for this purpose. Notwithstanding the sometimes relatively small production runs involved, complete and complex tooling has again been needed for the production of basic device components, such as arcing chambers or contact carriers. This generates higher production costs for devices which, as a result of the highly complex tools used in routine production, are also susceptible to failure and dimensional deviations.

The basic design of these switching devices incorporates a base module, having arranged therein an electromagnetic drive comprised of a yoke, a coil and an armature arranged in a moveable manner relative to the yoke, and a switching contact, comprising a stationary switching piece and a moveable switching piece arranged opposite the stationary switching piece, where switching between an "open" position and a "closed" position can be achieved via movement of the armature. An auxiliary switching unit is arranged on the base module, in which auxiliary switching unit is arranged a contact system comprised of a stationary switching piece and a moveable switching piece arranged opposite the stationary switching piece. The problem then arises that the base module incorporates different magnetic paths, such that mechanical coupling of an auxiliary switching unit cannot be executed on a base module of all dimensions.

SUMMARY OF THE INVENTION

In view of the foregoing, it is therefore an object of the present invention to provide a switching device which can be adapted to different switching device designs in the simplest possible manner.

This and other objects and advantages are achieved in accordance with the invention by a switching device comprising a base module, in which is arranged an electromagnetic drive comprised of a yoke, a coil and an armature arranged in a moveable manner relative to the yoke, and a switching contact, comprising a stationary switching piece and a moveable switching piece arranged opposite the stationary switching piece, where switching between an "open" position and a "closed" position can be achieved via movement of the armature, and comprising a modular auxiliary switching unit, in which is arranged a contact system consisting of a stationary switching piece and a moveable switching piece arranged opposite the stationary switching piece, where the coupling of the base module to the modular auxiliary switching unit is configured such that, in cases of a trip, regardless of the auxiliary switching unit used, different paths are transferable to the contact system of the auxiliary switching unit via an elastic element.

To this end, the auxiliary switching unit contact carrier comprises an elastic element, preferably in the form of a pressure spring, which serves as a follower for the auxiliary switch and acts on the moveable contact carrier in the auxiliary switch. The elastic element exerts a downward force F2 in the direction of the base module. A path S2 is traversed in the auxiliary switching unit thus transferring a path S1 to the base module. S1 is greater than S2, giving a difference X. Force F2 counteracts force F1. Force F1 is the force of the return pressure spring in the contactor or base module. Force F1 is greater than F2.

The core of the invention is the implementation of a coupling between the base module and the modular auxiliary switching unit which functions independently of the base module or the modular auxiliary switching unit selected, such that base modules of different dimensions can be combined with various modular auxiliary switching units. The modular auxiliary switching unit is thus not mechanically or positively bonded to the contact carrier of the base module. The magnetic path of the base module is thus dissociated from the path of the internal auxiliary switching unit, such that external auxiliary switching units of smaller dimensions can also be used. The magnetic path of the base module is thus of secondary importance in the configuration the external auxiliary switch. The overall depth of external auxiliary switching units can thus be optimized to any dimensions required. This results in a saving in overall depth, and thus provides a significant advantage over the competition.

The modular auxiliary switching unit is mechanically fitted to the front part of the arcing chamber of the base module. The connection plane of the coil terminal is thus arranged ahead of the main current circuits. The moveable contact carrier in the internal auxiliary switching unit is not mechanically or positively bonded to the contact carrier in the base module. This permits the use of modular auxiliary switching units of a variety of dimensions. In the disconnected state, the return springs ensure the secure contacting of the auxiliary contacts. The auxiliary switching unit, with its integral coil terminal, can be mounted flush to the edge of the device, in a central position or with any desired clearance to the outer edge of the device, according to the profile of the locator element of the base module. As a result of the modular design, the connection technology can be selected independently of the base module. Within the outline of the device, damping elements can be retrofitted by the client directly to the coil terminal.

In order to permit convenient routing of the coil connecting lead, a cable duct is incorporated in the modular auxiliary switching unit with its integral coil terminal, between the auxiliary contacts and the coil terminal. Exemplary embodiments are also conceivable that permit the fitting or removal of the modular auxiliary switching unit with its integral coil terminal, not only in-factory, but also by the client further to delivery. The modular auxiliary switching unit can be fitted with auxiliary NC contacts and/or auxiliary NO contacts as required.

In a particularly advantageous embodiment of the invention, the elastic element is a pressure spring. The pressure spring exerts a downward vertical force F2 in the direction of the base module. This is counteracted by the force F1 of the return pressure springs in the base module, acting vertically upwards in the direction of the auxiliary switching unit.

In a specific embodiment of the invention, a coil terminal is integrated in the modular auxiliary switching unit, arranged ahead of the main current circuits. The modular auxiliary switching unit is mechanically fitted to the base part of the arcing chamber of the base module, such that the connection plane of the coil terminal is positioned ahead of the main current circuits.

In a further specific extension of this embodiment in accordance with the invention, the modular auxiliary switching unit is configured as a standard auxiliary module, an auxiliary communications module, or an auxiliary capacitor switching contactor module. This variance of devices is made possible by the variable configuration of the switching device in accordance with the invention. The various auxiliary modules can be configured by the replacement of individual basic device components. Exchangeable device components include the connection technology, the surge limiter and the housing cover.

In a further embodiment in accordance with the invention, the modular auxiliary switching unit can be configured with screw terminal technology, spring contact technology or ring cable lug terminal technology. These three different connection technologies permit the greatest possible variance of devices, with no requirement for greater variance in the base module. The modular auxiliary switching unit is mechanically coupled to the housing of the arcing chamber of the base module. The unit is also detachable, such that the connection technology for the basic device can be changed via simple replacement, either in-factory or by the client. Specifically in switching devices of larger dimensions, particularly on the grounds of tooling costs, consideration must be given to the reduction of component variance in the basic device.

In a further embodiment in accordance with the invention, the basic configuration of the switching device comprised of a base module and a modular auxiliary switching unit can be reconfigured with base modules of different dimensions or modular auxiliary switching units with different functions. The modular auxiliary switching unit is not mechanically or positively bonded to the contact carrier of the base unit. This mutual dissociation of the modules permits the simple replacement thereof.

In a particularly preferred embodiment of the invention, damping elements can be directly retrofitted to the coil terminal. Within the outline of the device, these damping elements can be directly retrofitted by the client to the coil terminal. As a result, handling is simplified in this case, in that damping elements on a plurality of subassemblies are always arranged in the same position. For the purposes of technical implementation, an integral hinge-mounted flap can be arranged to open on the auxiliary switching unit, and a damping element can be inserted into the underlying recess, for example, in the form of a diode, a varistor or an RC element, for parallel connection to the coil. Client acceptance is thus enhanced, in that the client does not need to consider the provision of additional space in their design for any potential built-on components, specifically for damping.

In a further particularly preferred embodiment of the invention, a cable duct is arranged between the coil terminal and the auxiliary contacts. In common with the damping elements arranged within the outline of the device, the cable duct is of identical configuration for all dimensions. Equivalent handling arrangements for a variety of dimensions are further conducive to client acceptance, as the client does not need to take account of additional space for any built-on components.

In yet a further embodiment in accordance with the invention, the modular auxiliary switching unit can be fitted with auxiliary NC contacts and/or auxiliary NO contacts. Here again, variance will be possible, as no specification is defined.

In another embodiment, the switching device is a contactor.

The switching device in accordance with disclosed embodiments of the invention is preferably of a two-part configuration, and comprises a base module, preferably of quadrilateral configuration, having an upper side, an underside and four side elements. A connection region for electrical conductors is provided on one side element.

A separate modular auxiliary switching unit is detachably arranged on the base module, preferably on the upper side. The auxiliary switching unit can be configured as a standard auxiliary module, an auxiliary communications module, or an auxiliary capacitor switching contactor module. The auxiliary switching unit is preferably of quadrilateral design, with an upper side, an underside and four side elements. The modular auxiliary switching unit can be mechanically fitted to the base module housing, preferably in a recess in the base module.

The modular auxiliary switching unit is provided on its upper side with external coupling points for fittings, a cable duct and a coil terminal. An electromagnetic drive, comprising a coil, a yoke and an armature arranged in a moveable manner relative to the yoke, is arranged in the base module. A switching contact is also arranged in the base module, comprising a stationary switching piece and a moveable switching piece arranged opposite the stationary switching piece, where switching between an "open" position and a "closed" position can be achieved via a movement of the armature. A contact system, comprising a stationary switching piece and a moveable switching piece arranged opposite the stationary switching piece, is also arranged in the modular auxiliary switching unit.

In addition to the armature, return pressure springs are arranged in the base module that exert an upward vertical force F1 in the direction of the auxiliary switching unit. A contact carrier is arranged above the electromagnetic drive of the contactor. A contact carrier is also arranged in the auxiliary switching unit.

An elastic element, preferably a pressure spring, is arranged in the contact carrier of the auxiliary switching unit. The elastic element exerts a downward vertical force F2 in the direction of the electromagnetic drive of the base module. The force F1 of the return pressure spring is greater here than the force F2.

An integral hinge-mounted flap is also arranged on the upper side of the auxiliary switching unit. The flap can be opened, in order to insert a damping element into the underlying recess, for example in the form of a diode, a varistor or an RC element, for parallel connection to the coil.

The disclosed embodiments of the invention are characterized by a variable configuration of the device, associated with the use of a base module and a modular auxiliary switching unit. By the corresponding configuration of the modular auxiliary switching unit, via the replacement or fitting of devices in a manufacturing process, various switching device configurations can be produced in a simple manner. This advantageously leads to a reduction of component variance, by modular employment of individual components or individual subassemblies. This generates an associated cost reduction in the design of devices, associated with automation, specifically in the manufacture of small switching device production runs.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further advantages and embodiments of the invention are described hereinafter with reference to an exemplary embodiment and with reference to the drawings, in which.

DETAILED DESCRIPTION OF THE EXEMPLARY EMBODIMENTS

Figure 1:
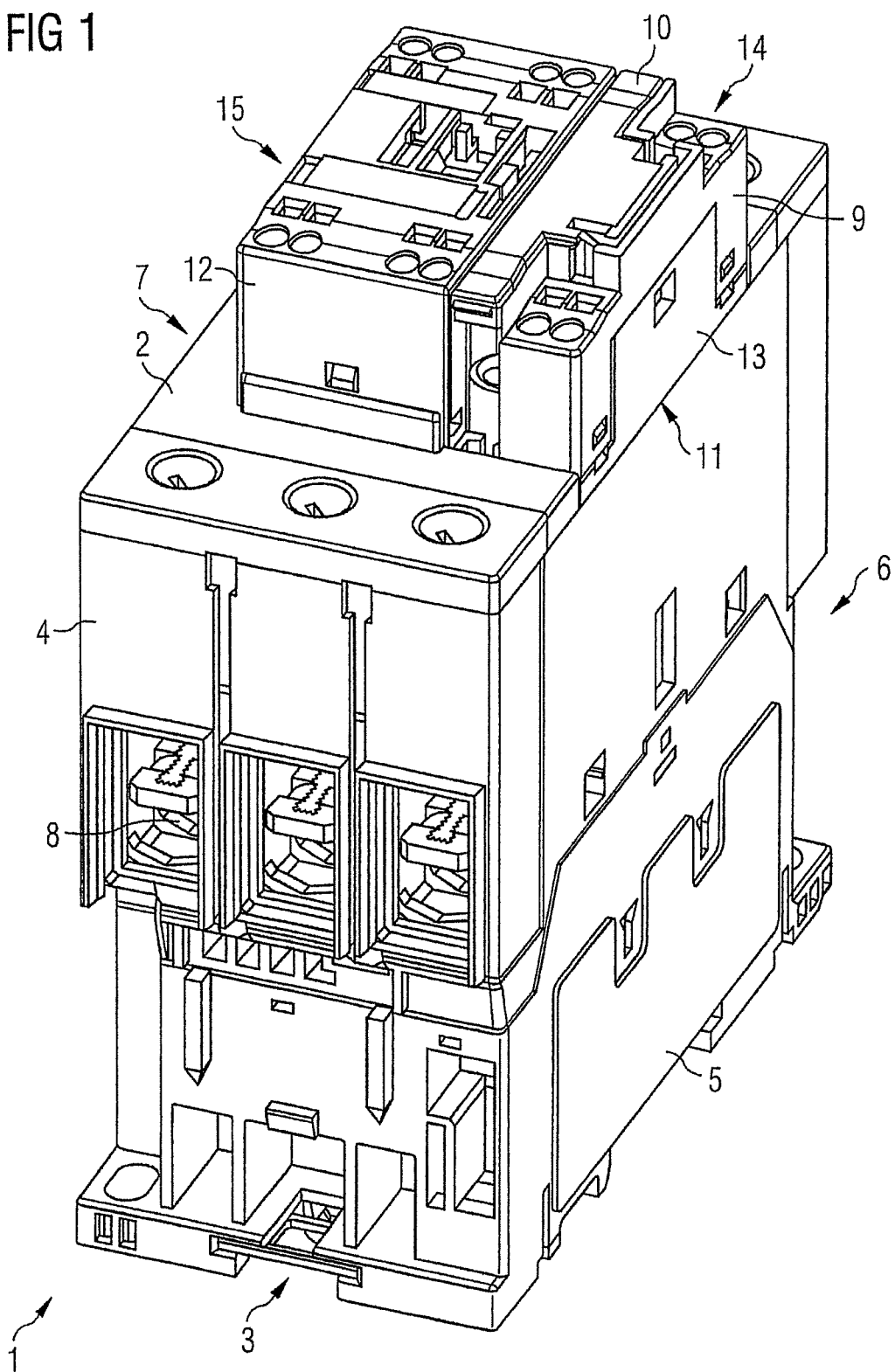
FIG. 1 shows a perspective view of a switching device in accordance with the invention, with a base module and a modular auxiliary switching unit.

FIG. 1 shows a switching device in accordance with the invention, specifically a contactor.

The switching device in accordance with the invention is of a two-part configuration, and comprises a base module 1, preferably of quadrilateral configuration, and having an upper side 2, an underside 3 and four side elements 4, 5, 6, 7. A connection region 8 for electrical conductors is preferably arranged on the side element 4. A separate modular auxiliary switching unit 9 is detachably arranged on the upper side of the base module 1. The modular auxiliary switching unit 9 can be configured as a standard auxiliary module, an auxiliary communications module, or an auxiliary capacitor switching contactor module. The modular auxiliary switching unit 9 is preferably of quadrilateral configuration, having an upper side 10, an underside 11, and four side elements 12, 13, 14, 15. The modular auxiliary switching unit 9 can be mounted on the base module 1, preferably in a recess on the base module 1. An external coupling point 16 for fittings, a cable duct 17 and a coil terminal 18 are preferably arranged on the upper side 10 of the modular auxiliary switching unit 9.

Figure 2:
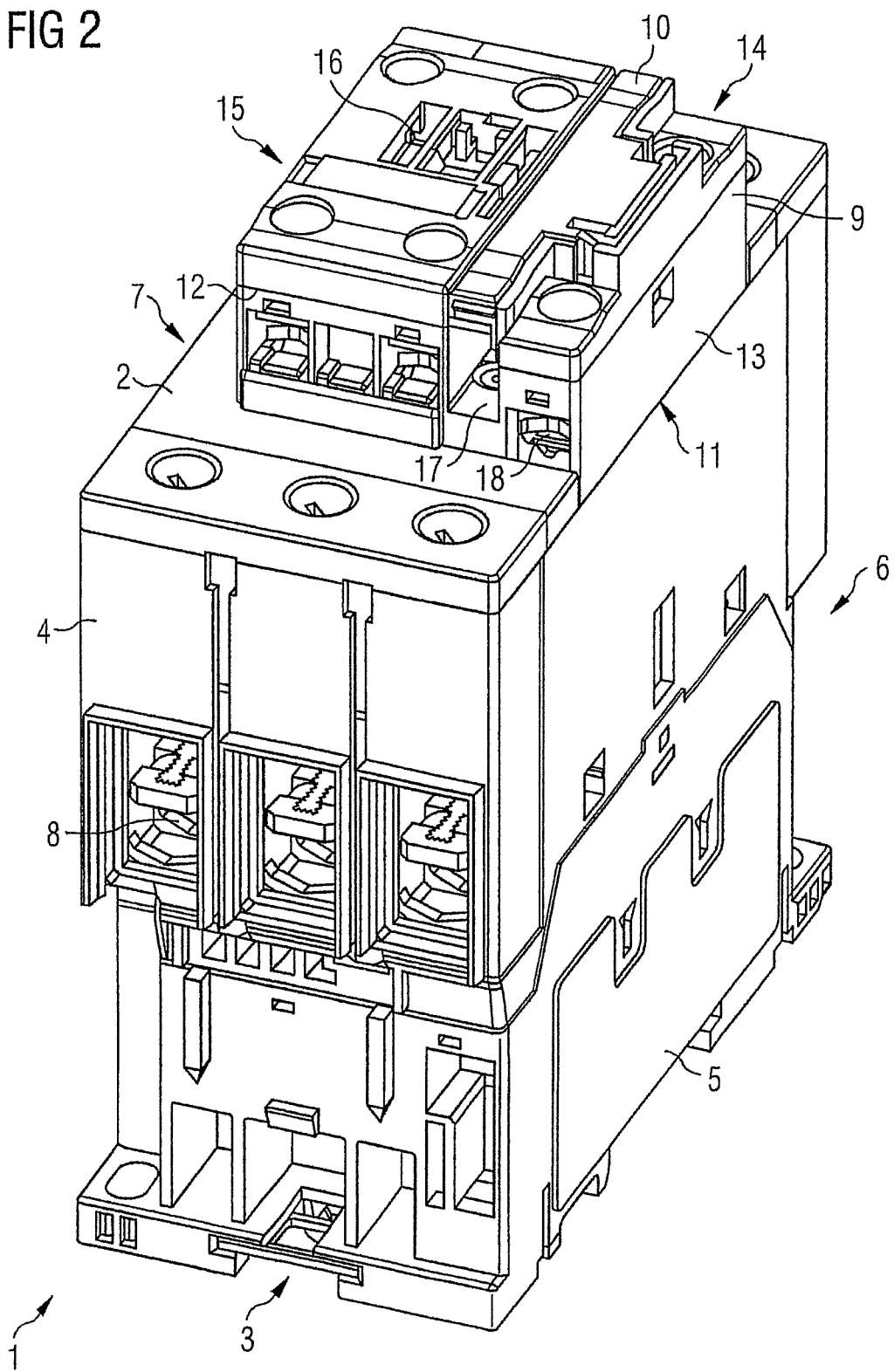
FIG. 2 shows a perspective view of a second exemplary embodiment of a switching device in accordance with the invention, with a base module and a further modular auxiliary switching unit.

FIG. 2 shows a second exemplary embodiment of a switching device in accordance with the invention with a base module 1, and a further exemplary embodiment of a modular auxiliary switching unit 9.

Figure 3:
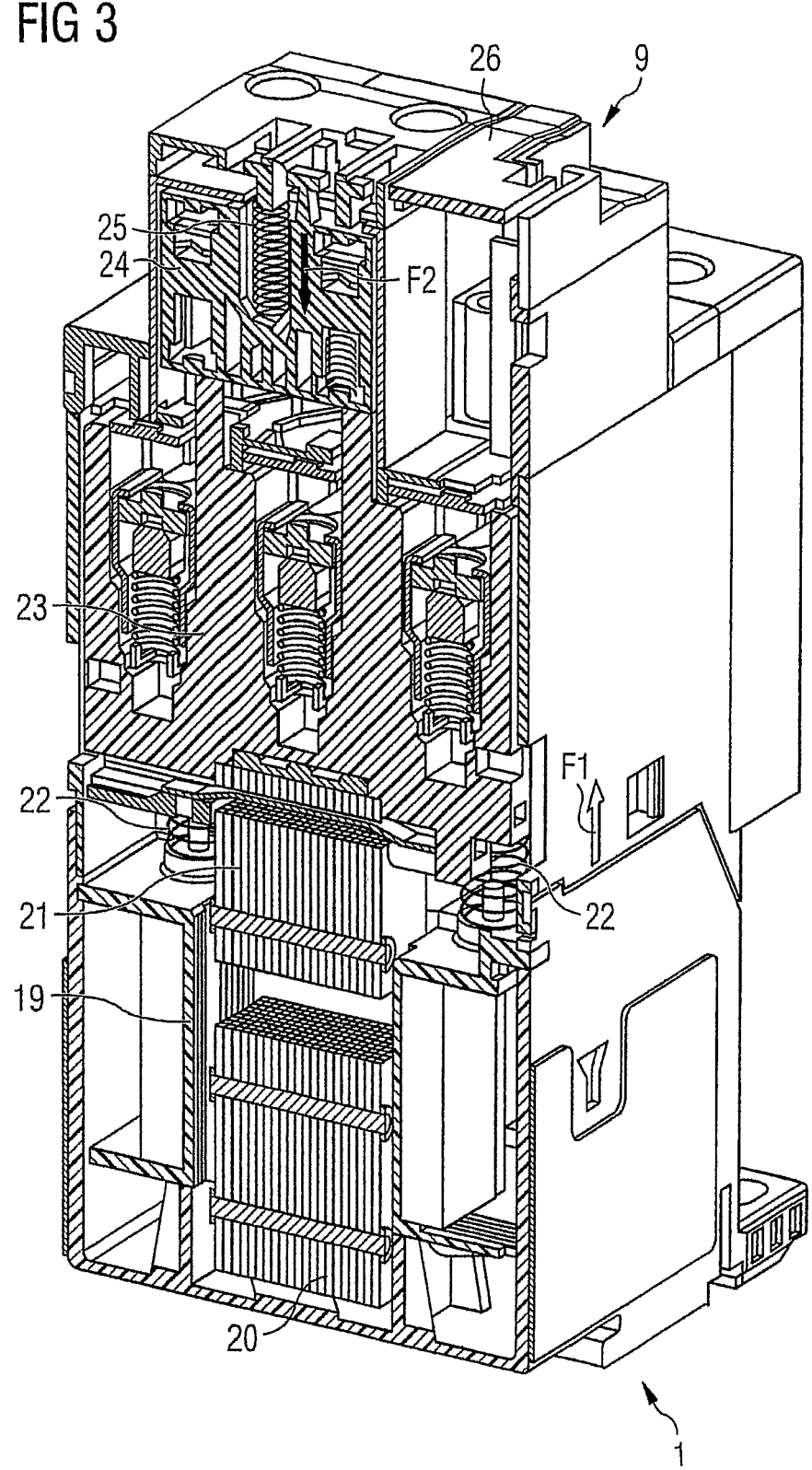
FIG. 3 shows a perspective view of a switching device in accordance with the invention, with an electromagnetic drive in the open position.

From FIG. 3, it can be seen that a magnetic drive, comprised of a coil 19, a yoke 20 and an armature 21 arranged in a moveable manner relative to the yoke 21, is arranged in the base module 1. Moreover, the base module 1 is equipped with a switching contact, comprising a stationary switching piece and a moveable switching piece arranged opposite the stationary switching piece, where switching between an "open" position and a "closed" position can be achieved via a movement of the armature 21. FIG. 3 shows the electromagnetic drive in the open position.

In addition to the armature 21, return pressure springs 22 are arranged in the base module 1, which exert a vertical upward force F1 in the direction of the auxiliary switching unit 9. A contact carrier 23 is arranged above the electromagnetic drive of the contactor. A contact carrier 24 is also arranged in the auxiliary switching unit 9, which is configured in a form-fitting arrangement to the contact carrier 23 of the base module 1. An elastic element 25, preferably a pressure spring, is arranged in the contact carrier 24 of the auxiliary switching unit 9. The elastic element 25 exerts a vertical downward force F2 in the direction of the electromagnetic drive of the base module 1. The force F1 of the return pressure spring is greater here than the force F2.

Moreover, an integral hinge-mounted flap 26 is arranged on the upper side 10 of the auxiliary switching unit 9. The flap 26 can be opened, in order to insert into the underlying recess a damping element, for example, in the form of a diode, a varistor or an RC element, connected in parallel to the coil.

Figure 4:
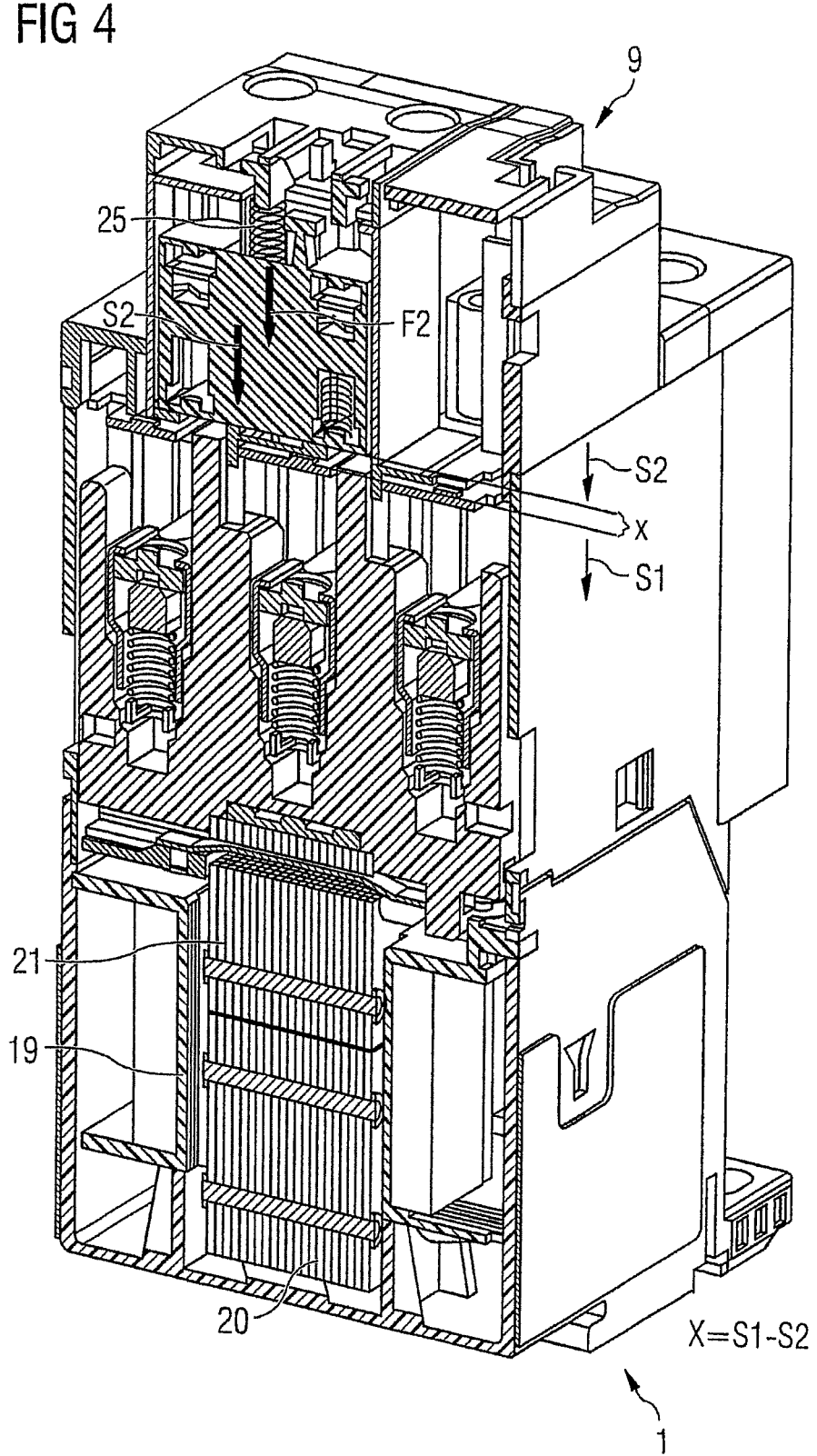
FIG. 4 shows a perspective view of a switching device in accordance with the invention, with an electromagnetic drive in the closed position.

FIG. 4 shows the electromagnetic drive of the switching device in accordance with the invention in the closed position. Here, the elastic element 25 exerts a downward force F2 in the direction of the base module 1. In the auxiliary switching unit, a path S2 is traversed, thus transferring a path S1 to the base module 1. As S1 is greater than S2, a difference X results, which is bridged by the elastic element 25.

The present invention is characterized by a variable configuration of the device, associated with the use of a base module and a modular auxiliary switching unit. By the corresponding configuration of the modular auxiliary switching unit, via the replacement or fitting of devices in a manufacturing process, various switching device configurations can be produced in a simple manner. This advantageously leads to a reduction of component variance, by the modular employment of individual components or individual subassemblies. This generates an associated cost reduction in the design of devices, associated with automation, specifically in the manufacture of small switching device production runs.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those element steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A switching device, comprising:
a base module including an electromagnetic drive comprising a yoke, a coil and an armature arranged in a moveable manner relative to the yoke, and including a switching contact comprising a stationary switching piece and a moveable switching piece arranged opposite the stationary switching piece, switching between an "open" position and a "closed" position be achieved via movement of the armature;
a removable modular auxiliary switching unit including a contact system consisting of a stationary switching piece and a moveable switching piece arranged opposite the stationary switching piece;
wherein coupling of the base module to the removable modular auxiliary switching unit is established such that, in cases of a trip, different paths are transferable to the contact system of the auxiliary switching unit via an elastic element independently of a utilized auxiliary switching unit;
wherein the elastic element exerts a downward force toward the base module in the closed position;
wherein a first path is traversed in the auxiliary switching unit to transfer a second path to the base module; and
wherein the second path is greater than the first path which establishes a difference which is bridged by the elastic element.

2. The switching device as claimed in claim 1, wherein the elastic element comprises a pressure spring.

3. The switching device as claimed in claim 2, further comprising:
a coil terminal integrated into the removable modular auxiliary switching unit.

4. The switching device as claimed in claim 1, further comprising:
a coil terminal integrated into the removable modular auxiliary switching unit.

5. The switching device as claimed claim 1, wherein the removable modular auxiliary switching unit is configured as one of (i) a standard auxiliary module, (ii) an auxiliary communications module and (iii) an auxiliary capacitor switching contactor module.

6. The switching device as claimed in claim 1, wherein a design of the switching device including the base module and the removable modular auxiliary switching unit is reconfigurable with one of (i) base modules of different dimensions and (ii) removable modular auxiliary switching units with different functions.

7. The switching device as claimed in claim 1, further comprising:
a cable duct arranged adjacent to the coil terminal.

8. The switching device as claimed in claim 1, wherein the removable modular auxiliary switching unit is fitted with at least one of (i) auxiliary NC contacts and (ii) auxiliary NO contacts.

9. The switching device as claimed in claim 1, wherein the switching device is a contactor.

* * * * *